United States Patent

Egerszegi

(10) Patent No.: US 9,435,715 B2
(45) Date of Patent: Sep. 6, 2016

(54) METHOD FOR CHARACTERIZING THE BEHAVIOUR OF A VEHICLE AND USE IN THE SELECTION OF THE TYRES OF THE VEHICLE

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventor: Christophe Egerszegi, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/763,969

(22) PCT Filed: Jan. 29, 2014

(86) PCT No.: PCT/EP2014/051696
§ 371 (c)(1),
(2) Date: Jul. 28, 2015

(87) PCT Pub. No.: WO2014/118214
PCT Pub. Date: Aug. 7, 2014

(65) Prior Publication Data
US 2015/0369704 A1    Dec. 24, 2015

(30) Foreign Application Priority Data
Jan. 31, 2013 (FR) .................................. 13 50804

(51) Int. Cl.
*G01M 17/00* (2006.01)
*B60G 7/02* (2006.01)
(Continued)

(52) U.S. Cl.
CPC ............. *G01M 17/04* (2013.01); *G01M 17/06* (2013.01)

(58) Field of Classification Search
USPC ...................................... 701/32.8; 280/86.753
See application file for complete search history.

(56) References Cited

U.S. PATENT DOCUMENTS 5,007,658 A * 4/1991 Blechschmidt ........ B62D 17/00
                                                   280/86.75
5,622,378 A * 4/1997 Schlosser ............... B62D 17/00
                                                   280/86.753
(Continued)

FOREIGN PATENT DOCUMENTS

EP    2 009 418 A2    12/2008
FR    2 958 400 A1    10/2011

OTHER PUBLICATIONS

International Search Report dated Jun. 6, 2014, issued by WIPO in connection with International Application No. PCT/EP2014/051696.

(Continued)

*Primary Examiner* — Thomas G Black
*Assistant Examiner* — Tyler Paige
(74) *Attorney, Agent, or Firm* — Fitzpatrick, Cella, Harper & Scinto

(57) ABSTRACT

To characterize a behavior of a vehicle, a subjective behavior test is conducted on a given configuration of a suspension device and a wheel disc of the vehicle to determine whether the vehicle's behavior is acceptable. Modifications are made to the given configuration so as to sweep through pairs of values corresponding to a lateral force Fy and a lateral offset Dy of the wheel in straight-line running. For each modified configuration of the suspension device and/or the wheel disc, the subjective behavior test is conducted again. For each configuration of the suspension device and the wheel disc tested, a determination is made of a pair of values of the lateral force Fy and the lateral offset Dy of the wheel in straight-line running. Areas Z of acceptable behavior of the vehicle in a plane Fy, Dy are determined.

13 Claims, 2 Drawing Sheets

(51) Int. Cl.
*G01M 17/04* (2006.01)
*G01M 17/06* (2006.01)

(56) References Cited

U.S. PATENT DOCUMENTS

| | | | | |
|---|---|---|---|---|
| 7,739,014 B2* | 6/2010 | Lu | ................... | B60T 8/1755 303/146 |
| 8,880,316 B2* | 11/2014 | Nishikawa | ............ | B60T 8/1755 701/41 |
| 2004/0133365 A1* | 7/2004 | Drumm | ................... | B60T 8/172 702/41 |
| 2005/0188753 A1 | 9/2005 | Kurai et al. | ................... | 73/146 |
| 2006/0080015 A1* | 4/2006 | Voeller | ................... | G01B 21/26 701/41 |
| 2007/0084276 A1* | 4/2007 | Matsuda | ............... | B60T 8/1725 73/146 |
| 2010/0121609 A1* | 5/2010 | Gorinevsky | ....... | G05B 23/0281 702/183 |
| 2012/0053802 A1* | 3/2012 | Tronnberg | ............. | B60K 23/04 701/69 |
| 2012/0109458 A1* | 5/2012 | Sidlosky | ................ | B60G 17/02 701/41 |
| 2012/0173040 A1* | 7/2012 | Yokota | ................... | B60W 40/11 701/1 |
| 2013/0066516 A1 | 3/2013 | Dailliez et al. | ............... | 701/32.8 |
| 2013/0318803 A1* | 12/2013 | Lokshyn | ............ | G01B 11/2755 33/288 |
| 2014/0365171 A1* | 12/2014 | Asano | ................... | B60W 40/13 702/174 |
| 2015/0224845 A1* | 8/2015 | Anderson | ............ | B60G 17/019 701/37 |
| 2015/0369704 A1* | 12/2015 | Egerszegi | ............. | G01M 17/06 701/32.8 |

OTHER PUBLICATIONS

R.P. Rajvardhan, et al., "Effect of Wheel Geometry Parameters on Vehicle Steering," SASTECH Journal, vol. 9, issue 9, pp. 11-18 (Sep. 2010), retrievable from: http://www.msrsas.org/docs/sastech_journals/archives/Sept2010/2.pdf.

D. Parekh et al., "Laboratory Tire Wear Simulation Process Using ADAMS Vehicle Model," Society of Automotive Engineers (SAE) Technical Paper Series 961001 (International Congress and Exposition, Detroit, Michigan, Feb. 26-29, 1996), pp. 1-10.

* cited by examiner

METHOD FOR CHARACTERIZING THE BEHAVIOUR OF A VEHICLE AND USE IN THE SELECTION OF THE TYRES OF THE VEHICLE

TECHNICAL FIELD

The present invention relates to the field of improvement of the road behavior of vehicles.

PRIOR ART

In the design of a vehicle, the vehicle manufacturer conducts a number of tests for the purpose of improving the behavior of the vehicle. These tests comprise tests known as "objective", for the quantitative description of the vehicle's behavior, and tests known as "subjective", for the qualitative determination of the vehicle's behavior. Subjective tests are conducted by testers who drive the vehicle and describe its behavior on the basis of their impressions.

Objective tests comprise, notably, braking, grip and safety tests. Subjective tests comprise, notably, parts of the test relating to straight line behavior, general behavior, and active safety. Straight line behavior includes maneuvers performed for small lateral accelerations of the vehicle, for example what are known as steering, linearity, drivability, centering, and other maneuvers.

The part of the test relating to straight line behavior has the aim, notably, of describing the vehicle's response on the basis of a generally low-amplitude angular force on the steering wheel exerted by the tester, to discover, for example, how the moment on the steering wheel or the yaw of the vehicle vary qualitatively and quantitatively in response to a variation of angle at the steering wheel during running at a stabilized speed, of the order of 100 km/h for example. Thus, for example, a vehicle showing a linear response exhibits behavior which is generally assessed as satisfactory by the tester, whereas a vehicle whose response is non-existent for a small angle of rotation of the steering wheel exhibits behavior which is generally assessed as unacceptable for the tester.

If the tester considers the straight line behavior of the vehicle unacceptable, the vehicle is modified and then retested by the tester so that the latter can check whether the vehicle shows satisfactory behavior after the modifications have been made. Since the cause of the unacceptable behavior is not known by the tester, the requests for modifications to be made are based on the tester's experience. They concern, but are not limited to, the tires, the wheels, the steering system, the geometry and the elements of the suspension device. The aforementioned steps are repeated until the vehicle exhibits straight line behavior which is satisfactory for the tester.

Consequently, the design of the vehicle is a relatively lengthy, and therefore costly, process.

In the following text, according to the context, the term "wheel" is to be understood either in a specific sense in which the wheel consists of a disc and a rim, or in a general sense which corresponds to the complete assembly composed of a wheel (disc and rim) and a tire.

BRIEF DESCRIPTION OF THE INVENTION

According to a first object, the aim of the invention is to provide a method for characterizing a given vehicle comprising a body, at least one wheel with a disc, a rim and a tire, and at least one suspension device connecting the wheel to the body.

This method is characterized in that it comprises the following steps:
   (A) for a given configuration of the suspension device and wheel disc, a subjective behavior test is conducted on the vehicle to determine whether or not the vehicle's behavior is acceptable;
   (B) the configuration of the suspension device and the wheel disc is modified so as to sweep through the respective values of the pair consisting of the lateral force Fy and the lateral offset Dy of the wheel in straight line running, and for each tested configuration of the suspension device and of the wheel disc the step of characterization (A) is carried out again;
   (C) for each tested configuration of the suspension device and the wheel disc, the pair of values of lateral force Fy and lateral offset Dy of the wheel in straight line running at a given stabilized speed are determined; and
   (D) the areas Z of acceptable behavior of the vehicle are determined in the plane Fy, Dy.

Preferably, the configuration of the suspension device and of the wheel disc is modified by varying a parameter selected from the group consisting of the toe-in/toe-out, the camber, and the offset of the wheel.

Also preferably, the subjective behavior test is a test of behavior at low lateral acceleration.

According to a first embodiment of the characterization method according to one object of the invention, for each tested configuration of the suspension device and the wheel disc, the pair of values of lateral force Fy and lateral offset Dy of the wheel in straight line running are determined in a relative manner with respect to a reference configuration of the suspension device and of the wheel disc.

Preferably, the lateral offset of the wheel is varied by inserting camber shims between the wheel disc and the suspension device, and the variation of lateral offset is estimated from the thickness of the inserted shims.

The lateral force of the wheel in straight line running at stabilized speed can also be varied by modifying the toe-in or toe-out, and the variation of lateral force can be estimated from the product of the drift rigidity of the tire and the variation of the toe-in or toe-out.

These estimates require only a simple routine characterization of the tire used at the speed in question.

According to a second embodiment of the characterization method according to one object of the invention:
   a model of the vehicle is used, making it possible to find the relationships between the acceleration imparted to the center of gravity of the vehicle and the forces, moments and attitudes of the vehicle wheels, in order to determine the forces, moments and attitudes at the center of the wheel in straight line running;
   a characterization of the wheel relating the lateral force Fy to the lateral offset Dy of the wheel is used; and
   for each tested configuration of the suspension device, the pair of values of lateral force Fy and lateral offset Dy of the wheel in straight line running are determined.

This second embodiment of an object of the invention has the advantage of being much more precise.

Advantageously, in order to characterize the wheel fitted with the tire:
   (A) the wheel is mounted on a test machine adapted to cause the wheel to roll on a moving rolling surface in given conditions, and to measure the set of forces and moments at the wheel center;

(B) the wheel is put into rotation in a given rolling configuration, and measurements are made, notably, of the rolling radius Re as well as, at the wheel center, the radial force Fz and axial force Fy and the moment along the longitudinal axis MX;

(C) the running condition of the wheel is varied, and step (B) is repeated; and (D) a characteristic Fy=f(Dy) is established, in which Dy is the lateral offset of the wheel, such that:

$$Dy=(MX-Fy*Re)/Fz$$

According to a second object, the invention is a method for selecting at least one wheel fitted with a tire on a vehicle in which:

(A) the vehicle is characterized by the method described above, to determine the areas Z of acceptable behavior of the vehicle;

(B) the wheel fitted with the tire is characterized by the method described above; and (C) the tire and the wheel are selected, with the suspension device of the vehicle adjusted in such a way that the vehicle fitted with the tire and the wheel exhibits a pair of values Fy, Dy in straight line running within an area Z of acceptable behavior.

The methods of the invention may be applied wheel by wheel basis, or on an axle by axle basis, for the purpose of characterizing the vehicle. The advantage of operating on an axle by axle basis is that right/left symmetry is preserved for the subjective behavior tests.

The main advantage of these methods is that the vehicle, the wheels and the tires are characterized independently, and these characterizations are used as the basis for direct determination of the selection of tires and wheels giving the vehicle good behavior for running with low lateral acceleration, and if necessary for guidance in the adjustment of the vehicle to achieve good adaptation of the available tires.

On the basis of a given characterized vehicle, a tire manufacturer skilled in the art can also define the characteristics of the tire architecture required to directly achieve satisfactory behavior of the vehicle fitted with these tires.

DESCRIPTION OF THE DRAWINGS

The invention will be more clearly understood from the following description which is provided solely by way of non-limiting example, and which refers to the drawings, in which.

DETAILED DESCRIPTION OF THE INVENTION

Figure 1:
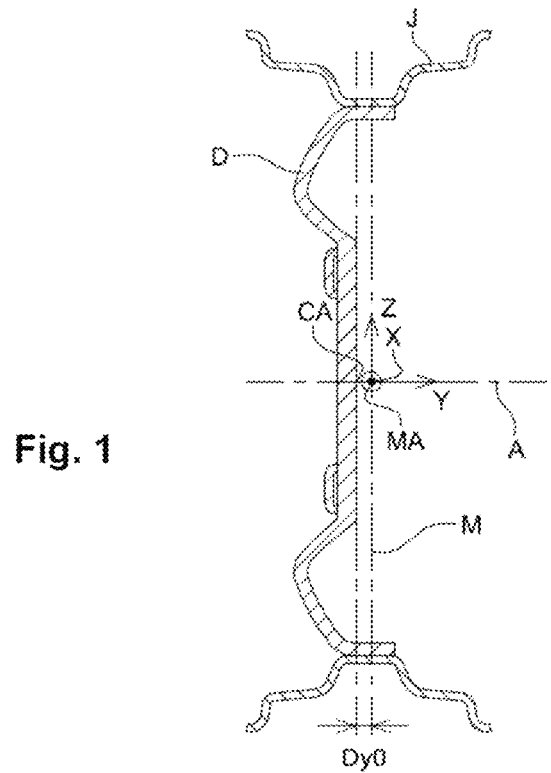
FIG. 1 shows a view of a vehicle wheel in axial section.

FIG. 1 shows a vehicle wheel, in the specific sense defined above, comprising a disc D and a rim J.

FIG. 1 also shows geometrical elements which are commonly identified on a wheel, namely the mid-plane M and the axis A of the wheel and the center CA of the wheel, usually called the wheel center. The center CA is a point defined by the intersection of the wheel axis A and a face of the disc D intended to bear on a hub carrying the wheel.

FIG. 1 also shows a geometric reference frame whose origin is at MA, the intersection between the axis A and the mid-plane M, called the wheel reference frame. This reference frame comprises axes X, Y and Z, orthogonal to one another and corresponding, respectively, to the usual longitudinal direction (X axis), transverse direction (Y axis) and vertical direction (Z axis) of a vehicle wheel. The transverse axis Y may also be denoted as the lateral axis.

It should be noted that, conventionally, the positive direction of the Y axis runs from the outside towards the inside of the vehicle, and the negative direction of the Y axis runs from the inside towards the outside of the vehicle.

When two wheels such as that shown in FIG. 1 form opposite wheels of the same axle, each of them forms a mirror image of the other. The same applies, therefore, to the wheel reference frames related to the respective points MA of the wheels.

It should also be noted that, conventionally, a moment having a substantially longitudinal axis is considered to be positive when it tends to reduce the camber of the wheel, and negative when it tends to increase the camber of the wheel. It will be recalled that the camber of a wheel is the angle, in a plane perpendicular to the ground and containing the axis A of the wheel, between the mid-plane M of the wheel and the mid-plane of the vehicle. The term "counter camber" (or negative camber) is used when the mid-planes M of the wheels of the same axle intersect above the ground.

Finally, it should be noted that the geometric offset of a wheel $Dy_0$ such as that shown in FIG. 1 is the distance between points CA and MA.

Figure 2:
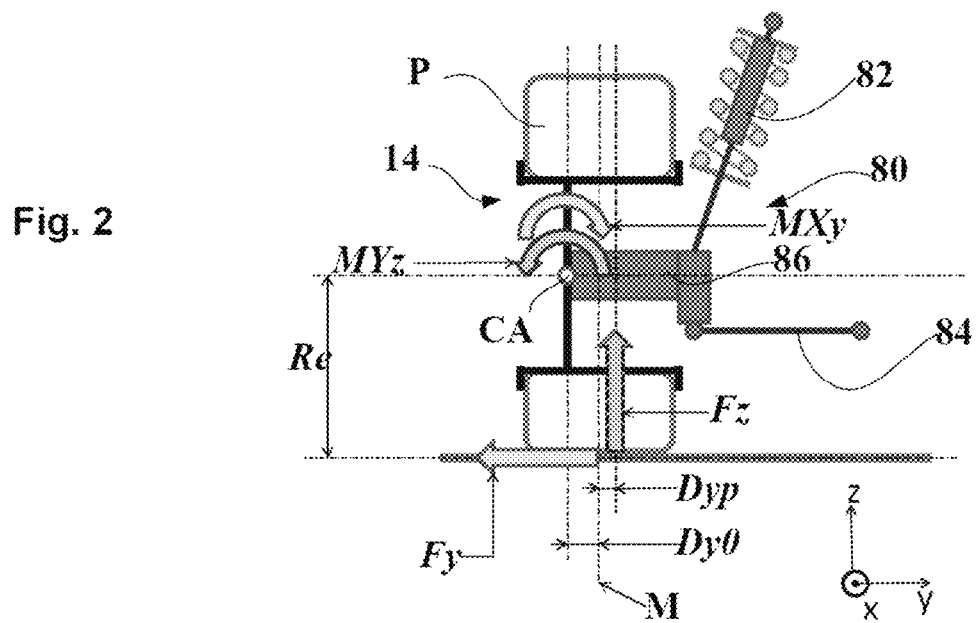
FIG. 2 shows in a schematic manner the forces and moments exerted on the wheel fitted on a suspension device.

FIG. 2 shows, in a highly schematic manner, the forces and moments applied to a wheel fitted with a tire P, mounted on a suspension device 80 of a front axle of a vehicle.

The suspension device 80 is shown schematically in the form of a shock absorber 82 and a suspension arm 84, both connected to the hub 86.

The wheel 14 exerts a moment about the X axis on the suspension device: MX. This moment has two components, of which the first MXy is linked to the resultant or centroid of the forces in the contact area orientated along the Y axis or lateral force Fy, and the second MXz is linked to the resultant of the forces in the contact area orientated along the Z axis or vertical force Fz.

The first component Mxy is equal to the product of the lateral force Fy and the rolling radius or loaded radius Re. The second component Mxz is equal to the product of the vertical force Fz and the offset of the wheel Dy. Thus:

$$MXy=Fy*Re \text{ and } MXz=Fz*Dy$$

The offset of the wheel Dy corresponds to the offset between CA, the wheel center, and the point of application of the vertical forces Fz. This offset has two components, namely a geometrical component linked to the value Dy0 described above, which is the distance between CA and the mid-plane of the wheel M, and a dynamic component corresponding to the distance between the mid-plane of the wheel and the centroid of the vertical forces Fz. This dynamic component is called Dyp. Thus:

$$Dy=Dy0+Dyp$$

The offset of the wheel can thus be found on the basis of the measurements at the wheel center of the lateral force Fy, the vertical force Fz and the moment along the longitudinal axis MX, with the measurement of the rolling radius or loaded radius Re.

$$Dy=(MX-Fy*Re)/Fz$$

Thus we find that the moment along the longitudinal axis MX exerted by the wheel on the suspension device, notably in straight line running, can be modified in two different ways, by variations of the lateral force Fy and by modifications of the wheel offset Dy.

It should be noted that the lateral force Fy can be measured either at the wheel center or in the ground contact area of the tire.

The method for characterizing the behavior of a vehicle according to one object of the invention consists in conducting subjective behavior tests at low lateral acceleration of the vehicle fitted with known tires while varying the configuration of at least one suspension device and the associated wheel of the vehicle, and preferably the two suspension devices and their associated wheels of the same axle.

This sweep can be made by varying the lateral force Fy in straight line running at a given stabilized speed, of about 100 km/h or more, depending on the vehicles in question. This is done, notably, by modifying the toe-in or toe-out of the two suspension devices concerned. It will be recalled that the toe-in corresponds, in straight line running, to the angle between the mid-plane of the vehicle and the mid-plane of the wheel. This angle is called the toe-in when the two mid-planes of the two wheels of an axle intersect in front of the vehicle, and is called the toe-out in the opposite case.

The sweep can also be carried out by varying the geometric offset of the wheel Dy0, for example by interleaving camber shims between the wheel center and the hub of the axle (negative variation) or by abrading the face of the disc in contact with the hub (positive variation of the geometric offset).

Figure 3:
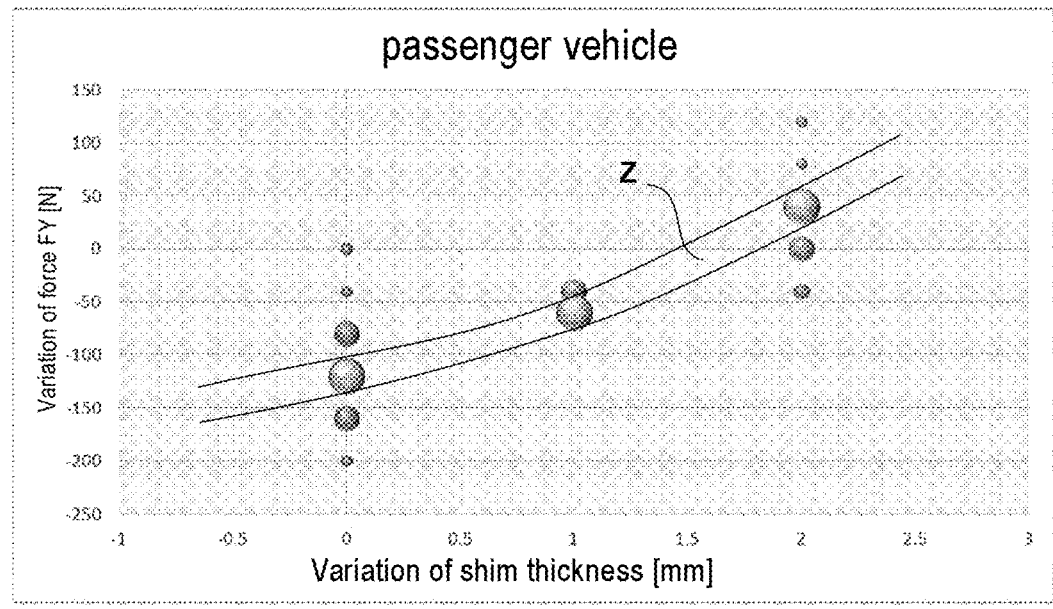
FIG. 3 shows the result of a characterization of a passenger vehicle.

FIG. 3 shows the results of a characterization of a passenger vehicle. The sweep through the conditions of the two suspension devices and their associated wheels on the same axle, namely the front axle of the vehicle, was carried out using a given adjustment of parallelism and lateral offset of the two tires as the reference.

Starting with these reference conditions, the force Fy was varied by progressively varying the parallelism of the vehicle, that is to say the toe-in and toe-out, until the optimum behavior of the vehicle for the given adjustment of offset was determined. The tests were then repeated with the addition of a 1 mm thick camber shim, and then a second identical shim, to give a total shim thickness of 2 mm. The corresponding variation in the geometric offset of the wheel was thus a decrease of 1 mm, and then 2 mm. The variation of the wheel offset between the reference configuration and the two tested configurations was estimated from this variation of the geometric offset of the wheel.

These tests make it possible to find, for each value of lateral offset, the adjustment conditions of the two suspension devices of the front axle of the vehicle for which the behavior of the vehicle is optimal.

For each tested configuration of the two suspension devices and their associated wheels, the variation of the lateral force $\Delta$Fy was estimated by finding the product of the drift rigidity of the tires and the variation produced in the toe-in or toe-out, and the variation of lateral offset $\Delta$Dy was estimated from the thickness of the camber shims removed (1 and 2 mm).

This gives us the results illustrated in FIG. 3. These results show that for each value of $\Delta$Dy there is an area Z of lateral forces $\Delta$Fy for which the behavior of the vehicle is optimal. This area Z is such that, as more shims are added (reducing the offset), the force Fy must increase in amplitude. The slope of this area Z may be positive or negative, depending on the reference configuration of the two suspension devices of the axle in question.

This graph confirms that the behavior of a vehicle in straight line running, at a given stabilized speed and with low lateral acceleration, is linked, notably, to the moments exerted by the wheels and the tires about the longitudinal axis MX, and to their two components Mxy and Mxz, and that this behavior can be described satisfactorily in the plane Fy, Dy.

FIG. 3 uses variations of lateral offset and lateral force, respectively, on the horizontal and vertical axes, the estimation of these values being a simple matter when the characteristics of the tires and wheels used are known.

It is also possible to obtain substantially more precise evaluations of the lateral force and lateral offset pair. These evaluations use an experimentally obtained characteristic of the wheel Fy=f(Dy), coupled to a vehicle model.

Figure 4:
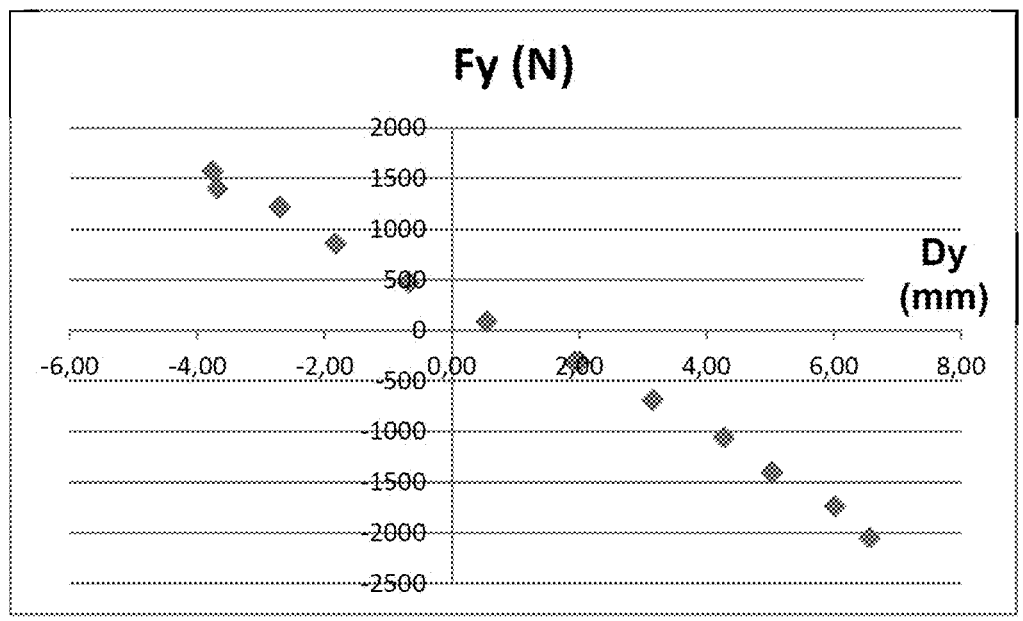
FIG. 4 shows a characterization in the plane Fy, Dy of a wheel.

FIG. 4 shows the result of a characterization of a wheel having a given tire, rim and disc and a given geometric offset.

This characterization was carried out on an ordinary rolling tester in the following conditions:
 tire: Michelin Energy Saver, size 205/55 R 16;
 rim 6.5 J 16;
 vertical load: 4,200 N;
 inflation pressure: 2.4 bar;
 speed: 100 km/h.
 drift angle: from −1 to +1 degree:
 camber: 0 degrees The results show a direct, virtually linear relationship between the wheel offset Dy and the lateral force Fy.

A model of the vehicle can, notably, be obtained by static characterizations on a K & C test rig. This model makes it possible to relate the acceleration at the center of gravity of the vehicle to the forces, moments and attitudes of the vehicle wheels, in order to determine the forces, moments and attitudes at the center of the wheel in straight line running, and notably the lateral force Fy and radial force Fz, as well as the moment along the longitudinal axis MX and the rolling radius Re.

A vehicle model of this type is well known to those skilled in the art of vehicles and is described, notably, in the paper by Deepak Parekh, Bruce Whittle, David Stalnaker and Ed Uhlir, "Laboratory Tire Wear Simulation Process Using ADAMS Vehicle Model", Society of Automotive Engineers (SAE), Technical Paper Series 961001 (International Congress and Exposition, Detroit, Mich., Feb. 26-29, 1996).

Thus by using this model it is possible to know, for the reference configuration of the suspension devices and of the associated wheels of the vehicle axles, and for all the tested configurations, the set of forces and moments applied to the wheel at the wheel center, and notably the lateral force Fy, the radial force Fz and the moment MX.

By coupling with the characteristic of the wheel Fy=f (Dy), it is thus also possible to allow for the interactions between the wheel and the adjustments of the suspension devices when determining the lateral force Fy and the lateral offset Dy. Thus the precision of the determinations is excellent.

When the areas Z of acceptable behavior have been established for the vehicle concerned, the fine adaptation of the tires, wheels and vehicles can be carried out on an a priori basis.

For a given vehicle, a person skilled in the art of tires can, notably, adjust the structural parameters of the tires, for example their taper angle and their drift rigidity, so as to adjust the lateral force and the relationship between the dynamic lateral offset and the lateral force of the tire in order to achieve, on an a priori basis, excellent behavior of the vehicle fitted with these tires.

The invention claimed is:

1. A method for characterizing a behavior of a vehicle that includes a body, a wheel having a wheel disc, a rim, and a tire, and a suspension device connecting the wheel to the body, the method comprising steps of:
   for a physical configuration of the suspension device and the wheel disc, conducting a behavior test on the vehicle to determine whether the behavior of the vehicle is acceptable in straight-line running at a stabilized speed, the physical configuration corresponding to a reference pair of conditions for a lateral force (Fy) and a lateral offset (Dy) of the wheel in straight-line running;
   modifying the physical configuration of the suspension device and the wheel disc a plurality of times so as to sweep through pairs of conditions presenting variations (ΔFy, ΔDy) from the reference pair of conditions for the lateral force (Fy) and the lateral offset (Dy) of the wheel in straight-line running, and, for each of the plurality of modified physical configurations of the suspension device and the wheel disc, conducting the behavior test again to determine whether the behavior of the vehicle is acceptable in straight-line running at the stabilized speed;
   for each physical configuration and each of the modified physical configurations of the suspension device and the wheel disc tested, determining Fy, Dy values of the lateral force (Fy) and the lateral offset (Dy) of the wheel in straight-line running at the stabilized speed; and
   representing, on a chart, Z-area pairs of the Fy, Dy values corresponding to acceptable configurations of the modified physical configurations and the physical configuration for which the acceptable behavior of the vehicle has been determined, the acceptable behavior being a linear response behavior in straight-line running at the stabilized speed,
   wherein the chart showing the Z-area pairs is utilizable to optimize at least one of: a tire structure, a wheel structure, a vehicle structure, and a selection of a wheel and a tire for the vehicle.

2. The method according to claim 1, wherein the step of modifying the physical configuration is performed by varying at least one of: a toe-in/toe-out parameter, a camber parameter, and an offset parameter of the wheel.

3. The method according to claim 1, wherein the behavior test is conducted at a low lateral acceleration.

4. The method according to claim 1, wherein, in the step of determining the Fy, Dy values, a value of the lateral force (Fy) and a value of the lateral offset (Dy) of the wheel are determined with respect to the physical configuration, which corresponds to a reference configuration of the suspension device and the wheel disc.

5. The method according to claim 4,
   wherein, in the step of modifying the physical configuration, the lateral offset (Dy) of the wheel is varied by inserting at least one camber shim of a known thickness between the wheel disc and the suspension device, and, in the step of determining the Fy, Dy values, a value of the lateral offset (Dy) of the wheel is estimated from a total thickness of the at least one camber shim inserted, and
   wherein, in the step of modifying step the physical configuration, the lateral force (Fy) of the wheel is varied by changing a toe-in or toe-out parameter, and, in the step of determining the Fy, Dy values, a value of the lateral force (Fy) is estimated from a product of a drift rigidity of the tire and the toe-in or toe-out parameter.

6. The method according to claim 1, further comprising steps of:
   using a model of the vehicle to determine relationships between an acceleration imparted to a center of gravity of the vehicle and forces, moments, and attitudes of vehicle wheels, in order to determine forces, moments, and attitudes at a wheel center of the wheel in straight-line running;
   using a characterization relating the lateral force (Fy) to the lateral offset (Dy) of the wheel; and
   for each physical configuration of the suspension device tested, determining a pair of values of the lateral force (Fy) and the lateral offset (Dy) of the wheel in straight-line running at the stabilized speed based on the model and the characterization.

7. The method according to claim 6, further comprising a step of characterizing the wheel by:
   mounting the wheel on a test machine, the test machine being structured to cause the wheel to roll on a moving rolling surface in given conditions, and to enable a rolling radius and a set of forces and moments at the wheel center to be measured;
   rotating the wheel in a given rolling configuration, and measuring the rolling radius Re, a radial force (Fz), the lateral force (Fy), and a moment (MX) along a longitudinal axis;
   varying a rolling condition of the wheel, and repeating the steps of rotating and measuring; and
   determining a characteristic Fy=f(Dy), such that:

$$Dy=(MX-Fy*Re)/Fz.$$

8. The method according to claim 1, wherein the method is executed for each assembly of a suspension device and a wheel of the vehicle, in succession.

9. The method according to claim 1,
   wherein the vehicle includes at least two axles, each axle of the at least two axles being fitted with two suspension devices and two wheels, and
   wherein the method is executed axle by axle.

10. The method according to claim 6, further comprising a step of selecting a wheel and tire combination, the selecting including:
    characterizing the vehicle according to the Z-area pairs representing conditions of acceptable behavior of the vehicle,
    characterizing the wheel by determining a characteristic Fy=f(Dy) of the wheel, and
    selecting the wheel and tire combination by adjusting the suspension device of the vehicle in such a way that the vehicle when fitted with the wheel and tire combination exhibits a pair of values of the lateral force (Fy) and the lateral offset (Dy) in straight-line running in an area corresponding to one of the Z-area pairs representing conditions of acceptable behavior of the vehicle.

11. A method for characterizing a behavior of a vehicle that includes a body, a wheel having a wheel disc, a rim, and a tire, and a suspension device connecting the wheel to the body, the method comprising steps of:
    using a model of the vehicle to determine relationships between an acceleration imparted to a center of gravity of the vehicle and forces, moments, and attitudes of vehicle wheels, in order to determine forces, moments, and attitudes at a wheel center of the wheel in straight-line running;

using a characterization relating a lateral force (Fy) to a lateral offset (Dy) of the wheel;

for each physical configuration of a plurality of physical configurations of the suspension device, determining a pair of values of the lateral force (Fy) and the lateral offset (Dy) of the wheel in straight-line running at a stabilized speed; and for each physical configuration of the plurality of physical configurations, performing a behavior test to determine whether the vehicle exhibits a linear response behavior in straight-line running at the stabilized speed, wherein pairs of values (Fy, Dy) corresponding to physical configurations determined to cause the vehicle to exhibit the linear response behavior are utilizable to optimize at least one of: a tire structure, a wheel structure, a vehicle structure, and a selection of a wheel and a tire of the vehicle.

12. The method according to claim 11, further comprising a step of characterizing the wheel by:

mounting the wheel on a test machine, the test machine being structured to cause the wheel to roll on a moving rolling surface in given conditions, and to enable a rolling radius and a set of forces and moments at the wheel center to be measured;

rotating the wheel in a given rolling configuration, and measuring the rolling radius Re, a radial force (Fz) the lateral force (Fy), and a moment (MX) along a longitudinal axis;

varying a rolling condition of the wheel, and repeating the steps of rotating and measuring; and determining a characteristic Fy=f(Dy), such that:

$$Dy=(MX-Fy*Re)/Fz.$$

13. The method according to claim 12, further comprising a step of making adjustments for the wheel by:

characterizing the vehicle according to areas Z of acceptable behavior of the vehicle, utilizing the characteristic Fy=f(Dy) of the wheel, and adjusting the suspension device of the vehicle in such a way that the vehicle when fitted with the wheel in combination with the tire exhibits a pair of values of the lateral force (Fy) and the lateral offset (Dy) in straight-line running within one of the areas Z of acceptable behavior of the vehicle, wherein the areas Z of acceptable behavior correspond to conditions for which the vehicle exhibits the linear response behavior.

* * * * *

UNITED STATES PATENT AND TRADEMARK OFFICE
CERTIFICATE OF CORRECTION

PATENT NO. : 9,435,715 B2  
APPLICATION NO. : 14/763969  
DATED : September 6, 2016  
INVENTOR(S) : Christophe Egerszegi It is certified that error appears in the above-identified patent and that said Letters Patent is hereby corrected as shown below:

In the Claims

Column 7  
Line 66, "modifying step" should read --modifying--.

Column 10  
Line 4, "(Fz)" should read --(Fz),--.

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*